US009226044B2

(12) United States Patent
Daniels (10) Patent No.: US 9,226,044 B2
(45) Date of Patent: Dec. 29, 2015

(54) METHOD FOR REAL TIME DISTRIBUTION OF DEALERSHIP GENERATED DATA AND MEDIA ORIGINATING FROM A RETAIL ENVIRONMENT

(71) Applicant: Brothers Media Group, LLC, Jacksonville, FL (US)

(72) Inventor: Jerry D. Daniels, Ponte Vedra Beach, FL (US)

(73) Assignee: Brothers Media Group, LLC, Jacksonville, FL (US)

( * ) Notice: Subject to any disclaimer, the term of this patent is extended or adjusted under 35 U.S.C. 154(b) by 0 days.

(21) Appl. No.: 14/176,842

(22) Filed: Feb. 10, 2014

(65) Prior Publication Data
US 2014/0229985 A1 Aug. 14, 2014

Related U.S. Application Data

(60) Provisional application No. 61/762,845, filed on Feb. 8, 2013.

(51) Int. Cl.
| | |
|---|---|
| *H04N 21/25* | (2011.01) |
| *H04N 21/81* | (2011.01) |
| *G06Q 30/00* | (2012.01) |
| *H04N 21/258* | (2011.01) |
| *H04N 21/433* | (2011.01) |
| *H04N 21/4788* | (2011.01) |
| *H04N 21/6543* | (2011.01) |

(52) U.S. Cl.
CPC .............. *H04N 21/812* (2013.01); *G06Q 30/00* (2013.01); *H04N 21/25875* (2013.01); *H04N 21/4333* (2013.01); *H04N 21/4788* (2013.01); *H04N 21/6543* (2013.01)

(58) Field of Classification Search
CPC .............. H04N 21/812; H04N 21/435; H04N 21/4126; H04N 21/436; H04N 21/4622; H04N 21/2143; H04N 21/237; H04N 21/266; H04N 21/41415; H04N 21/4532; H04N 21/458; G06Q 30/02
USPC .......................................... 725/34, 36, 78, 82
See application file for complete search history.

(56) References Cited

U.S. PATENT DOCUMENTS

| | | | |
|---|---|---|---|
| 5,331,544 A | 7/1994 | Lu et al. | |
| 8,010,402 B1 | 8/2011 | Sharma et al. | |
| 8,078,495 B2 | 12/2011 | Zeevi et al. | |
| 2003/0070167 A1* | 4/2003 | Holtz et al. | ..................... 725/32 |
| 2003/0088436 A1* | 5/2003 | Berger et al. | ..................... 705/1 |

(Continued)

*Primary Examiner* — Pankaj Kumar
*Assistant Examiner* — Alexander Boyd
(74) *Attorney, Agent, or Firm* — Akerman LLP (57) ABSTRACT

A system for real time distribution of data and media is disclosed. The system may include a processor that executes instructions to authenticate an employee into an application based on login information received for the employee. The processor may enable the employee to access the application if the employee is authenticated. Once the employee is logged in, the processor may receive media content and information associated with a customer and may transmit the media content and the information to a device of a manager for approval. After the media content and the information are transmitting to the device of the manager, the processor may receive the approval of the media content and the information from the device of the manager. The processor may then proceed to interrupt currently displayed media content on a display device to display video content including the media content and the information associated with the customer.

19 Claims, 7 Drawing Sheets

(56) References Cited

U.S. PATENT DOCUMENTS

| | | |
|---|---|---|
| 2004/0111321 A1 | 6/2004 | Kargman |
| 2008/0004894 A1 | 1/2008 | Son et al. |
| 2008/0249866 A1* | 10/2008 | Angell et al. .................. 705/14 |
| 2008/0250464 A1* | 10/2008 | Masucci et al. ................ 725/82 |
| 2009/0119013 A1 | 5/2009 | O'Malley |
| 2009/0144157 A1* | 6/2009 | Saracino et al. ................ 705/14 |
| 2009/0221312 A1 | 9/2009 | Franklin |
| 2011/0077990 A1 | 3/2011 | Storage |
| 2011/0270659 A1 | 11/2011 | Crites |
| 2011/0317979 A1* | 12/2011 | Smith et al. ................... 386/241 |
| 2012/0278847 A1* | 11/2012 | Yokoi .......................... 725/116 |
| 2013/0013529 A1* | 1/2013 | Chheda et al. ................ 705/342 |
| 2013/0195429 A1* | 8/2013 | Fay et al. ..................... 386/278 |

* cited by examiner

METHOD FOR REAL TIME DISTRIBUTION OF DEALERSHIP GENERATED DATA AND MEDIA ORIGINATING FROM A RETAIL ENVIRONMENT

CROSS REFERENCE TO RELATED APPLICATIONS AND PRIORITY

The present application claims priority to U.S. Provisional Application No. 61/762,845, filed Feb. 8, 2013, the entirety of which is hereby incorporated by reference.

FIELD OF THE INVENTION

The present application relates to content and data distribution systems, and more particularly, to a method and accompanying system for real time distribution of dealership generated data and media originating from a retail environment.

BACKGROUND

In today's increasingly technology-driven environment, people and businesses regularly utilize mobile devices, computers, tablets, and other similar devices to access various types of Internet services, perform work-related tasks, conduct business or other transactions, consume various types of content, and carry out a variety of other tasks and functions. For example, users often utilize such devices to access digital news, video content, audio content, gaming content, educational content, and tremendous amounts of information that are readily available on the Internet. Additionally, users use such devices to sell and advertise various types of products and services. As a result, users and businesses have been able to access information and content of interest more efficiently, effectively, and quickly than ever before. With the advent of social media, users can not only keep in touch with contacts such as friends, family, colleagues, and business contacts in a quick and easy manner, but can also determine what topics, products, and content their contacts are interested in. Notably, businesses have increasingly begun advertising their products and services on social media web pages to attract users to their products and services, while also simultaneously saving on expenditures for advertising and selling through traditional advertising and selling portals. As a result, more and more users are able to access information about products and services in a faster and more convenient way than through more traditional content distribution means such as televisions, newspapers, word-of-mouth, and other means. Nevertheless, the user experience can be improved, content can be made more readily available to users, and new methods and systems for distributing such content in a more effective manner are needed.

SUMMARY

A system and accompanying methods for the real time distribution of data and media are disclosed. In particular, the system and methods may be utilized for the real time distribution of automotive dealership generated data and media that originates from a retail environment. In most traditional dealerships, consumers interact with salespeople to purchase or lease vehicles, and the salespeople often utilize computers or other devices to obtain information about the vehicles and store certain identifying information about the consumers in their dealership management systems. According to the present disclosure, the systems and methods may involve authenticating an employee into an application, such as a mobile application, based on login information that the employee inputs into the application. The systems and methods may enable the employee to access the application based on the login information. Once the employee is authenticated and logged in, the employee may utilize the application to capture media content and information associated with a customer, particularly when the customer is purchasing a product.

The media content and information associated with the customer may be sent by the employee to a device of a manager for approval by utilizing the application. The manager may approve the media content and the information associated with the customer and the approval may be sent from the device of the manager to the system. Once the media content and information associated with the customer are approved, the system may interrupt currently displayed media content on a display device to display video content including the media content and the information associated with the customer. As a result, the system may trigger specific and unique customer data collected at the point of sale and embed the data into a video or other media to run instantaneously on various display or other devices. The media content and information associated with the customer may be pushed electronically to dealership social media networks, dealership digital signage networks, dealership management systems, or any other desired network or system at the time of approval or at any other designated time.

In one embodiment, a system for real-time distribution of data and media is disclosed. The system may include a memory that stores instructions and a processor that executes the instructions to perform various operations. An operation of the system may include authenticating an employee into an application, such as a mobile application, based on login information received for the employee. The system may enable the employee to access the application if the employee is authenticated based on the login information received for the employee. Additionally, the system may be configured to receive, via the application, media content and information associated with a customer. The system may then transmit the media content and the information associated with the customer to a device of a manager for approval. When the manager approves the media content and the information associated with the customer, the system may receive the approval of the media content and the information associated with the customer from the device of the manager. Notably, the system may interrupt currently displayed media content on a display device to display video content including the media content and the information associated with the customer.

In another embodiment, a method for real-time distribution of data and media is disclosed. The method may include authenticating an employee into an application based on login information received for the employee. Additionally, the method may include enabling the employee to access the application if the employee is authenticated based on the login information received for the employee. The method may also include receiving, via the application, media content and information associated with a customer. The method may include transmitting the media content and the information associated with the customer to a device of a manager for approval, and receiving the approval of the media content and the information associated with the customer from the device of the manager. Furthermore, the method may include interrupting, by utilizing instructions from memory and executed by a processor, currently displayed media content on a display device to display video content including the media content and the information associated with the customer.

According to another exemplary embodiment, a computer-readable device having instructions for real-time distribution of data and media is provided. The computer instructions, which when loaded and executed by a processor, may cause the processor to perform operations including: authenticating an employee into an application based on login information received for the employee; enabling the employee to access the application if the employee is authenticated based on the login information received for the employee; receiving, via the application, media content and information associated with a customer; transmitting the media content and the information associated with the customer to a device of a manager for approval; receiving the approval of the media content and the information associated with the customer from the device of the manager; and interrupting currently displayed media content on a display device to display video content including the media content and the information associated with the customer.

These and other features of the systems and methods for real-time distribution of data and media are described in the following detailed description, drawings, and appended claims.

DETAILED DESCRIPTION OF THE INVENTION

Figure 1:
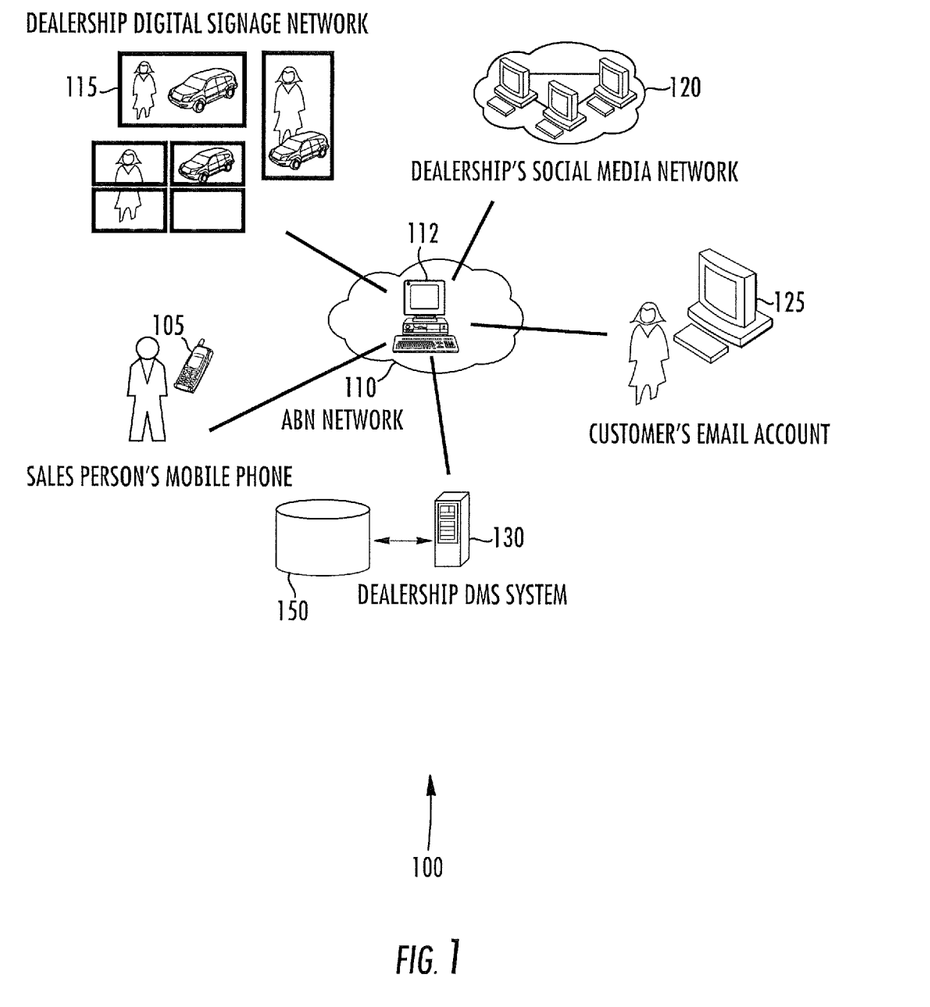
FIG. 1 is a schematic diagram of a system for real time distribution of data and media according to an embodiment of the present disclosure.

Referring generally to FIG. 1, a system 100 and accompanying methods for the real time distribution of data and media are disclosed. In particular, the system 100 may be utilized for the real time distribution of automotive dealership generated data and media that originates from a retail environment. However, the system 100 may be utilized in any other context and is not intended to be limited to the automotive dealership context. The system 100 may perform operations such as authenticating an employee into an application, such as a mobile application, based on login information that the employee inputs into the application, such as by utilizing mobile device 105, and enabling the employee to access the application based on the login information. Once the employee is authenticated and logged in, the employee may utilize the application to capture media content and information associated with, e.g., descriptive of, a customer, such as during a point of sale with the customer as well as from other sources as described in more detail below.

According to various embodiments, the system 100 system is configured to generate media content comprising customer data, including captured media content, employee data, or business data into animated content. For example, the system may receive, store, access, modify, edit, or embed customer data, employee data, including images, text, audio and generate an animated presentation, any of which may be generally referred to as system data. The animated presentation may be a video presentation that includes audio. The animated presentation may therefore comprise a multimedia presentation including video with animation and audio. As described in more detail below, the system 100 may include various definable themes or pre-defined from which the system 100 may use to generate media content. For example, the system 100 may include a plurality of base themes from which a user may select. In various embodiments, selections of themes may be available as add-ons which may be purchased or subscribed to separately or in groups. The themes may comprise features that may be editable by a user to create a more user-centric theme. For example, a theme may include geographic specific aspects that may be edited into the base theme. According to various embodiments, the user has a selection of graphic themes that include specific base animations or audio components. Once selected for application in the system 100, these components are used to automatically generate media content such as video or audio, including both video and audio, which includes static content provided by the user, e.g., employee data, customer data, business data, or other provided, including captured, data.

The system 100 may use or be programed to use a variety of themes for generating media content. In some embodiments, various categories of themes include employee related themes and customer related themes, however, the two may overlap to some extent in some embodiments. Examples of various categories of employee themes may include business and personal life events such as births, graduations, anniversaries, achievements, job promotions, awards, sales, performance, get well, condolences, marriages, congratulations, business and personal mile stones, good luck, or well wishes to name a few. Examples of various categories of customer themes may include business and personal life events, e.g., similar to examples above, as well as consumer related themes, such as past or current purchases.

According to various embodiments, a user may access the system via an application that may be run on an electrical device as described here. The user may be required log into the system through the application, which may include authentication of the application or user. For example, user may be an employee of an automotive dealership that may use the application to communicate with the system 100 one or more devices, such as a personal computer, client system, personal communication device such as a phone, PDA, smartphone, etc. The application may be an employee application having limited privileges with respect to the system 100. In some embodiments, the level of privileges will be conferred by log-in information, device ID, or the application, e.g., different applications may be coded or programed to include different features. For example, an employee having employee level access may be required to be authenticated and logged in at which time the employee may utilize the application to capture media content and information associated with, e.g., descriptive of, a customer, such as during a point of sale with the customer as well as from other sources as described in more detail below. For example, captured media content comprising customer data may be sent by the employee to a device of a manager for approval by utilizing the application. The manager may approve the media content and the information associated with the customer and the approval may be sent from the device of the manager to the system 100.

In various embodiments, the system 100 may include administrator devices or devices networked or otherwise in communication with the system 100 that have been conferred with administrative authority with respect to system data, e.g., identification, authentication, incorporation, or use, which may be referred to as a management or administrator application. For example, a device of a manager may be conferred, e.g., via the application, device ID, log-in information, etc., with the ability to review, edit, identify, assign, categorize, or authorize system data. Different levels of administrative rights or permissions may be distributed to devices by the system. In some embodiments, a device having administrative authority may monitor devices running system applications or in communication with the system. In one embodiment, the administrative device may disconnect or request the system cease communication of system data with another device. Thus, the manager identified by the employee or system to receive the captured media content or other customer data may have a level or set of administrative privileges that includes data approval with respect to receiving, authenticating, approving the storage or incorporation of the data into the system 100, which may further include privileges associated with controlling generated media content. In certain embodiments, administrative applications may also be used as employee applications used to capture system data, e.g., capture customer data, employee data, or business data. Accordingly, employee application may generally refer to applications that may be used to capture system data for presentation to the system 100, which may or may not need to be approved.

As introduced above, a system application may be configured to capture the customer data, e.g., photograph, or other information and may assign or request that the system 100 generate media content. The customer data may include the customer data captured by the employee, e.g., a photograph of the customer with a purchase, a photograph of a wedding ring, as well as additional customer data otherwise obtained by and presented to the system 100 by the employee, or existing customer data associated with the customer within the system 100. The data may be captured with the device running the application, which may include downloading the data to the system 100 or device running the application. In one embodiment, the employee may submit captured customer data to the system 100. In some instances, an employee may submit a request for generation of media content incorporating the customer data, which itself may include media content. Depending on the desired configuration or application, the request may identify a customer, customer data, theme, or include a theme request that the system 100 is to use to generate media content. For example, the employee may identify a "first car" theme, which the system 100 may use to generate media content incorporating the customer data. In some embodiments, the system 100 may generate the media content requested using the customer data and send to an administrator application for approval by a manager or may wait for approval from an administrative application of the manager prior to generating media content. As such, in various embodiments, the manager may approve the customer data and request prior to generation of the media content or may approve the generated media content, which may include viewing the generated media content. In some embodiments, the manager may modify or edit employee data, customer data, a theme request, e.g., identify a different theme or additional customer data for the system 100 to apply for generating the media content.

Once the media content and information associated with the customer are approved, the system 100 may interrupt currently displayed media content on a display device to display video content including the media content and the information associated with the customer. It is to be appreciated that display may also include presenting or displaying audio content associated with the video content, including photo and animation. For example, the video content can be a video congratulating the customer for the customer's purchase of a new vehicle, a goodwill message, a sales promotion, a seasonal or holiday message, an award, or anything else. As a result, the system 100 may trigger, collect, retrieve, or select, e.g., one or more customer data from pre-defined customer data categories, specific and unique customer data collected at the point of sale and generate media content incorporating the customer data, e.g., embed the data into a video or other media, including multimedia, to run simultaneously on various display or other devices at a selected or designated time, which in some instances may include instantaneously on the various display or other electronic devices.

The media content and information associated with the customer may be pushed electronically to dealership digital signage network 115, dealership social media network 120, email servers 125, dealership management system 130, or any other desired network or system at the time of approval or at any other designated time. By providing consumers with real time access to information concerning themselves and the products and services they purchase and use, consumers may be more likely to transact with and visit businesses that provide such services to consumers. In various embodiments, customers may receive or review the information related to them, e.g., customer data, via the email services 125 as well as other routes of transmission, such as by text message or through various messaging systems, including third-party messaging systems such as social media networks that the customer may participate, have an account, or be otherwise accessible to the customer, for example, by creating a guest account, new account, or the like. In one embodiment, the customer may be given an internet address to a website or link where the customer may access their customer data or generated media content including their customer data such as a video or other information, e.g., by selecting the video and information. In some embodiments, the customer may be given a code to access the customer data or generated media content. In one embodiment, the customer may be asked to approve the customer data or generated media content for presentation, for example for presentation on a third-party social networking website in which the customer participates, e.g., "tag" the customer in a posting including the video.

Referring to the drawings and in particular to FIG. 1, a system 100 for real time distribution of data and media is schematically illustrated. The system 100 may include a mobile device 105, an automotive broadcasting network (ABN) 110, a server 112 of the ABN 110, a dealership digital signage network 115, a dealership social media network 120, customer email servers 125, a dealership management system 130, and a database 150. The server 112, the customer email servers 125, the mobile device 105, and any of the other devices in the system 100 may include memories that stores instructions and processors that executes the instructions from memory to perform various operations for the system 100 or otherwise. In one embodiment, the mobile device 105 and the server 112 may be any type of computer device, such as, but not limited to, a computer, a server, smartphone, a tablet, a laptop, or any other suitable computing device.

Notably, the system 100 may perform any of the operative functions disclosed herein by utilizing the processing capabilities of server 112 and the storage capacity of the database 150. The processors of the devices disclosed herein may be software, hardware, or a combination of hardware and software. As noted above, the memories of the devices in the system 100 can store instructions that the processors may execute to perform various operations of the system 100. For example, the server 112 may assist in processing loads handled by the various devices in the system 100 and any other suitable operations conducted in the system 100, or otherwise. In one embodiment, multiple servers 112 may be utilized to process the functions of the system 100. The server 112 and other devices in the system 100, may utilize the database 150 for storing data about the customers, products, media content, social networking information, or any other information that is associated with the system 100. In one embodiment, multiple databases 150 may be utilized to store data in the system 100.

In various embodiments, the system 100 comprising a transcoding module configured to transcode static content into animated content. These transcoding capabilities of the system 100, for example, may include taking static data, such as system data comprising customer data, employee data, or business data including images or texts and generating media content comprising an animated presentation. The animated presentation may be a video presentation that includes audio. The animated presentation may therefore comprise a multimedia presentation including video with animation and audio. In various embodiments, the transcoding module includes or is programmed to follow various defined themes to transcode data content. For example, the database 150 may include various defined themes as described above, which may be pre-defined or base themes, from which a user may select. In various embodiments, selections of themes may be available as add-ons which may be purchased or subscribed to separately or in groups. In one embodiment, the system 100 may categorize themes for ease of selection. The themes may comprise features that may be editable by a user to create a more user-centric theme. For example, a theme may include geographic specific aspects that may be edited into the base theme. According to various embodiments, the user has a selection of graphic themes that include specific base animations or audio components. Once selected for application in the system 100, these components are used to automatically generate media content such as video or audio, including both video and audio, which includes the static content provided by the user, e.g., employee data, customer data, business data, or other provided data. In this way, the system 100 is configured to transcode static image and text formats into a rich multimedia animation comprising visual and audio aspects.

In various embodiments, the system 100 comprises customized audio capabilities. For example, the system 100 may be configured to receive and incorporate audio provided by a user of the system 100. The audio may be provided in various ways and by various devices. For example, telephones, microphones, analog or digital recorders, smartphones, text-to-voice services or applications, or devices capable of presenting or communicating audio data to the system 100 may be used. In one embodiment, the system 100 application may comprise a voice message feature that a user may access from a connected, including wirelessly connected, device. For example, a display device may include a voice message or voice embedding button that may be selected by a user to trigger reception or recording of audio from the user that may be subsequently input into the system 100 for association or incorporation into generated media content according to a theme. The audio may comprise employee or customer data for example. The audio may also comprise audio tracks received by a back-end transcoding module, which may be associated with the transcoding module, for specific incorporation with an identified generated media content, e.g., for a voiceover application. In one embodiment, a system user may capture customer data and send the data for approval by management, such as a user of a management application having or capable of obtaining, e.g., via an access code, management or administrative privileges or authority. For example, the management application may be authorized to authenticate or approve the consumer data. The management application, which may run on a mobile display device or other electronic device in communication with the system 100, may prompt the user or include a record audio button to optionally select to record an audio message. For example, upon approving the consumer data, the user of the management application may select the audio button and record a congratulatory message in real-time into the mobile device. The audio track may then be recorded and uploaded to the backed-end transcoding module which may then insert the audio track into the media content for playback in the dealership.

In various embodiments, media content, including generated media content, may include customer facing content. Customer facing content may originate as unique customer data that has been obtained, captured, or otherwise input into the system 100. For example, unique customer data may include anniversaries, graduation (actual or projected date, school name, location, level, area of study, school colors or mascot, etc.), birthdays, purchase history, and loyalty data such as personal or family purchase history.

In one embodiment, the unique customer data includes data obtained from the customer in response to a survey or list of questions such as personal profile questionnaire. Questionnaires may comprise electronic forms completed by a customer in the dealership or online. For example, a customer may receive a questionnaire by email to complete and send to the system 100. The customer may receive the questionnaire for presentation on a personal mobile electronic device such as a smartphone comprising a user interface in which the customer may use to answer various questions. In one embodiment, the customer may receive the questionnaire in paper form or electronically while in the dealership. The customer may answer questions while in the dealership, which may be subsequently received by the system 100, including manual or electronic input of answers at client or networked device or application. The questionnaire may include questions seeking any type of customer data that is descriptive of the customer including the customer's family and associations. For example, the questionnaire may include questions seeking data descriptive of the customer such as likes and dislikes, memberships, associations, employer, names of children or other family members, personal achievements, goals, sport teams, as well as favorite, proudest, or most embarrassing moments. Thus, answers provided by the customer in response to such questions may comprise values input into the system 100 that may be stored for future retrieval and incorporation with other customer data, e.g., customer data comprising media content, or into generated media content, all of which may include customer facing content.

Notably, the system 100 may further associate customer data with categories of customer data for selection and use in association with system applications or processes, such as application of customer data to the various pre-defined themes. For example, the system may associate customer data with customer data categories and subcategories such as video data, image data, audio data, textural data, historical data, future data, family data, like data, dislike data, whimsical data, etc. such that generation of customer facing content may include or comprise a selection of customer data from one or more categories. As such, the system 100 may be configured to select customer data from pre-defined categories of customer data to generate and present personalized customer facing content. In various embodiments, the system 100 comprises a theme proposal generator that may be adaptable to propose or present potential themes for generation of media content based on system data, including customer data. The user may approve or select one or more themes proposed for generation by the theme proposal generator or identify other or additional themes from which media content is to be generated.

The theme proposal generator may be configured to analyze customer data for relationships with themes or categories of themes. Themes may thus include relationship data with respect to categories or types of customer data, which may also include situational system data, such as a current date, parties present at the dealership, or occurrence of an event, e.g., a recent championship won by a favorite sport team. Selection of themes for proposal may thus be refined by data and categories of data or situations. For example, the theme proposal generator of the system 100 may be configured to refine or identify themes or categories of themes upon, for example, a user confirming or inputting into the system 100 situational customer data. For example, a customer may arrive at the dealership with a family member, such as a child. The system 100 may be presented with such information, which the system 100 may use to select, propose, or determine an appropriate customer facing content to be generated, such as a multimedia presentation that includes customer data related to the family data category. The system 100 may also request additional customer data, such a photograph. The system may also request situational customer data. For example, the system 100 may analyze customer data associated with a customer present at the dealership and request additional information based on the analysis. In the above example, the system 100 may determine that the customer has a child with an upcoming birthday, which may prompt the system 100 to request additional situational information regarding whether the child is present. Even if absent, in one embodiment, the system 100 may also propose generation of the media content which the customer may subsequently access through email, social networking, etc., e.g., to show the child. In one embodiment, the display of the generated media content may also be captured to capture reaction of those observing the display. In one embodiment, the customer facing content includes a multimedia message displayed or presented at the dealership recognizing a birthday of the customer or the family member, e.g., a simultaneous display on a plurality of display devices throughout the dealership may include "We interrupt our regular scheduled program to bring you this very important message: Happy 6th Birthday Bobby!". The above may include text, audio, images, or video. For example, a voice may make the announcement in addition to or instead of displayed text. A happy birthday song may also be played. Photographs of the child, taken at the dealership just prior to the generation of the media content or previously may be included, or stock images of a birthday cake, balloons, princesses, sports, racecars, etc. may also be included. In another example, customer data may be incorporated into various life event themes to generate media content to announce a birth that may request or incorporate customer data related to sex or name of the child, birthdate, or other information such as a picture of the child. The generated media content may apply the customer data along with other system data such as stock designs, photographs, video, or audio, e.g., cribs, storks, rattles, lullabies etc. In another example, a wedding announcement or congratulation may incorporate the location of the wedding, bride, groom, wedding parties, honeymoon location, date, photographs, etc. The generated media content may apply the customer data along with other system data such as stock designs, photographs, video, or audio, e.g., wedding bells, top hat, wedding dress, etc.

The categories of customer data may also be used by the system 100 to select appropriate or apt customer data for generation of customer facing content. For example, customer facing content may include selection of animation or text incorporating multiple categories, e.g., customer facing content may include a selection from a first customer data category the value of which may further define presentation of customer data from another category. Thus, the system 100 may use a favorite or school color identified in a favorite or education category to present an animation or text congratulating the customer with respect to a life event identified in a life event category.

In one embodiment, generation of customer facing content by the system 100 includes selecting customer data from pre-defined categories in a pre-defined sequence, which may be defined by a theme as described above. For example, the customer facing data may include generation of a multimedia message including a selection from one of the like data category and historical data category followed by a selection from the dislike data category. Thus, the multimedia message may include text or audio (when customer data comprises audio or is input in or converted to audio in the system) such as "grew up on a farm in Idaho and dislikes potatoes." In another example, the customer facing content may include a consumer loyalty recognition aspect which may include identification of a number, type, or date of one or more previous purchases. For example, customer facing content may include a media or multimedia message displayed or presented as described herein to include identification of past purchases of the customer or family members, e.g., "loyal customer since 1987" or "purchased first car here in 2007". The message may further include customer data from an image data category or subcategory of the customer with the purchased car. For example, the generated media content may include a photographic image of the customer a the newly purchased car along with text or audio "continuing the tradition". Past cars and the newly purchased car and related customer data may also be presented in sequence or in a montage that may include audio accompaniment. Notably, for various reasons such as date or incorporation of the system 100, customer data may not always include images from certain historical purchases according to a defined them, thus the system may need to access an image repository to obtain and associate an image corresponding to certain data, such as an image, e.g., stock photo, of a 1987 Civic approximating the vehicle purchased by the customer at a previous date for incorporation into the customer facing content. The system 100 may also be configured to receive and associate historical data with a customer or entity via an automated process that extracts and associates customer data from electronic sources, such as dealership records, or via manual data entry. Thus, customer facing content may include unique customer data that is used to create a multimedia experience within the dealership that leaves a memorable impression on the customer. In one embodiment, it may be desirable to present generated customer facing media content as described herein to create a wow moment endearing the customer to the dealership.

In various embodiments, media content may include employee facing content. Employee facing content may originate as specific employee or business related data that has been obtained, captured, or otherwise input into the system. For example, employee data may be obtained from employment applications or forms completed by employees that are entered into the system 100. As with customer data, employee data may include data from questionnaires, which in some embodiments, may be similar to questionnaires described above. Employee data may be, for example, text, photographs, audio, video, etc. As described above, the employee data is typically stored by the system in an accessible form for retrieval and application in subsequent system processes, for example when sought by the system 100 according to a defined theme. Business data may include data related to the dealership, such as sales, employees, defined groups of employees, business goals, hours, location, inventory, projections, etc. Business data may be entered into the system 100 or the system may be configured to obtain certain types of business data for use in the system. Employee facing content may include employee data as well as customer data. For example, employee facing content may be displayed on all or selected devices associated or in communication with the system. In one embodiment, employees may access charts, rankings, or graphs depicting relationships between system data. For example, employees running the system application may view or be presented with by the system 100 various sales data associated with individuals or groups. The generated media content may foster competitive fun. For example, the employee facing content may depict images or animations of the employees running around a base path, football field, racetrack, or across the galaxy in spaceships wherein the content illustrates relationships between system data such as employee, customer, or business data. The data may include, for example, vehicle sales, sales of yellow cars, sales of cars to people from Kansas or their hometown, years employed at the dealership, days until certain life events such as birthdays, number of recognitions or awards and so on.

In one embodiment, generated media content, either employee or customer facing, includes employee or customer data comprising images superimposed or presented in accordance with a theme with pre-defined images, such as background images, which as described above may be or be related to customer or employee data. For example, an image of a customer with a purchased product, such as a vehicle, may be displayed against one or more backgrounds such as famous or distant locations, e.g., pyramids, Paris, on the field or in the parking lot of their favorite sports team. Such predefined images may be stored in an image repository associated with the database 150 for association with customer data by the system 100.

In various embodiments, generated media content may include audio, such as songs, inspirational messages, humorous messages from a family member, generated audio wherein customer or employee data has been incorporated therein. Fellow employees or managers may provide inspirational or congratulatory statements of appreciation for example. The generated content may include customer data or employee data comprising images. For example, the images may be presented in a sequence that may include audio.

Additionally, the ABN 110, the dealership digital signage network 115, and the dealership social media network 120 of the system 100, may be utilized to link all the devices in the system 100 to one another such that information and data may be transferred between devices in the system 100. The ABN 110, the dealership digital signage network 115, and the dealership social media network 120 may include, but are not limited to including, a wireless network, an ethernet network, a satellite network, a broadband network, a cellular network, a private network, a cable network, the Internet, an internet protocol network, any network, a television network, or any combination thereof. In one embodiment, the ABN 110 may be the primary network of the system 100. Notably, the system 100 may utilize a combination of software and hardware to perform the operative functions and services of the system 100 disclosed herein.

Although FIG. 1 illustrates a specific example configuration of the various components of the system 100, the system 100 may include any configuration of the components, which may include using a greater or lesser number of the components. For example, the system 100 is illustratively shown as including a mobile device 105, a server 112, customer email servers 125, and a database 150. However, the system 100 may include any number of mobile devices 105, servers 112, customer email servers 125, any number of databases 150, or any number of any of the other components in the system 100. Furthermore, in one embodiment, substantial portions of the functionality of the system 100 may be performed by the server 112 without the needs for the database 150.

Figure 2:
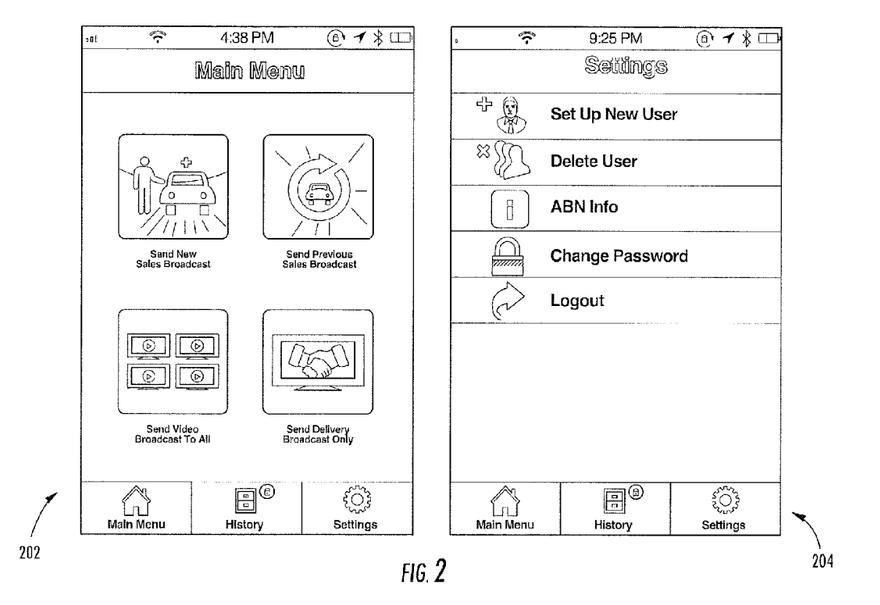
FIG. 2 illustrates screenshots of a mobile application of the system for real time distribution of data and media according to an embodiment of the present disclosure.

Operatively, the system 100, as shown in FIG. 1, may be configured to provide for the real time distribution of media content and data, particularly for the real time distribution of automotive dealership generated data and media that originates from a retail environment. The mobile device 105 may present a mobile application of the dealership via an interface of the mobile device 105 to an employee of the dealership. Referring now also to FIG. 2, screenshots 202 and 204 illustrate an exemplary illustration of a sample interface for the mobile application. In screenshot 202, a sample main menu is illustrated, which features options for sending a new sales broadcast, sending a previous sales broadcast, sending video broadcasts to all devices connected to the mobile application, and sending delivery of the broadcast only. Screenshot 204 illustrates a setting section of the mobile application that allows an employee or other user to register with the mobile application. The mobile application can store any information about purchases, customers, or any information traversing the system 100.

As introduced above, in various embodiments, the system 100 may be configured with a security and management module configured to define, manage, detect, and perform various security and management operations, which may include providing and accessing various levels of administrative privileges. Prospective users, an employee for example, can attempt to log into the mobile application by entering login information by utilizing the mobile device 105 or other device that the employee is currently using. The mobile application may be connected to a WiFi network, cellular network, or other network, and can authenticate the employee against a list of users authorized to use the mobile application when the employee attempts to log into the mobile application. The list of authorized users may be stored in database 150, which is communicatively linked to the ABN 110. For example purposes, once the employee is authenticated into the mobile application by the system 100, the employee can use the mobile application to either: (1) take a photograph of a customer with the customer's newly purchased vehicle, or (2) select a generic photograph of the vehicle that the customer purchased. Of course, any other type of information of media content may be captured by the mobile device 105 that is associated with the customer or otherwise. At this point, for example, the employee can designate the dealership's vehicle stock number, year, make, model, and color for the purchased car via the mobile application. Additionally, the employee can enter in the customer's first and last name and email address into the mobile application. At this point, the employee can select a manager having management or administrative privileges from the list of managers to approve the submission of this information and can submit the information to the ABN 110 or any other network connected to the ABN 110 by utilizing the mobile device 105.

In various embodiments, the security and management module includes location security features. For example, the system 100 may comprise a location module configured to continuously or periodically ping or monitor location of devices running the application or communicating with the system 100 to obtain location data with respect to the devices. The location module may provide the security and management module the location data for further processing or application of location related protocols. Location data may be in the form of GPS coordinates or other data obtained by GPS technologies, cell ID, Wi-Fi, inertial sensors, or other known or developed manners of determining location. The security and management module may include a location security protocol defining a pre-defined area in which access to the system 100 is to be restricted. In some embodiments, when the security and management module determines a user to be beyond or outside the pre-defined area, the system 100 may send an alert to system administrators, management, or management applications. For example, in one embodiment, when a user captures customer data, the mobile device running the application registers the location data, such as GPS location of the device. The location data may be embedded in the customer data or may be sent or provided to the location module periodically or on an event related basis, such as upon communication of customer data. If the security and management module determines the location of the device or customer data falls outside the pre-defined access area, for example a 3 mile radius around the dealership, the system may block the process and alert the administrators or management via an automatic alert.

In certain embodiments, the system 100 includes a security portal, which may be associated with the security and management module, allowing the user to define and modify security definitions and protocols. For example, a user may access the security portal to modify one or more security levels or overall security level. The user may also redefine security risks to be recognized by the system such as new or obsolete risks or to otherwise customize the level of security. Additionally, the system 100 may provide various selectable security definitions and protocols defining actions that may be taken upon determination of identified security concerns or breaches. Certain types or categories of customer data may be considered a security risk to the customer and therefore use of such data by the system 100 may be restricted. The type of data the system 100 may be configured to restrict may be pre-defined or defined by the user. Because the type of data considered to present a security risk may change over time, in some embodiments, the user may access the security portal to define or modify types of data to be restricted. For example, the system 100 may be configured to assign specific risks to customer data collected or input into the system. The system may also tag certain customer data for manual, administrative, or secondary review that may represent a risk. In one example, the system 100 may refrain from presenting customer data commonly used as security questions to provide access to customer accounts such as mother's maiden name or name of first pet and so on. In certain embodiments, the user may enter customer specific requests to restrict partly or entirely certain customer data. For example, a customer may wish to opt out of certain features of the system 100 for various reasons and the system 100 may be configured to honor such a request.

The selected manager can receive a notification on a device that her or she is using via the mobile application's native push notification process. In one embodiment, the notification can include the photo and other information that the employee input into the mobile application for the customer. After reviewing the photo and other information, the manager can either approve the photo and information input by the employee or reject the photo and information. If the manager rejects the photo and information, the process can end. For example, if an obscene photo is used, the manager can reject the photo and prevent rogue employees from posting inappropriate content. However, if the manager approves of the photo and information, the photo and information may be forwarded to the dealership digital signage network 115, which can cause the photo and information to be displayed on various devices at the dealership. For example, the photo and information may be displayed on horizontally mounted televisions and monitors, vertically mounted televisions and monitors, video walls, and other types of display devices. The photo and information may also be forwarded to the dealership's social media network 120 and can be posted on a social media page of the dealership. In one embodiment, the photo and information may be posted on a social media wall or webpage.

In addition to forwarding the photo and information to the dealership digital signage network 115 and the dealership's social media network 120, the photo and information may be forwarded to the ABN 110 internal mail servers and/or email servers 125 so that the photo and information may be further forwarded to the customer's email address. Once the manager approves the photo and information, the dealership digital signage network 115 may be interrupted, which can cause all televisions and devices in the dealership to begin playing a special video and audio message that includes the customer's unique data, such as the customer's name, vehicle information, and photograph. The message may be an exciting congratulatory segment that can be designed to stimulate positive emotional responses from the customer and to briefly transform the dealership into a celebration venue for the customer. The video and audio message may also be pushed to the dealership's social media network 120 for posting. In one embodiment, the photo and information may be pushed electronically to the dealership management system 130, which can reconcile the photo and information with a previous record for the customer that is already contained in the dealership management system 130. In one embodiment, the photo may be attached to the record for the customer. In one embodiment, an email may be sent to the customer and can contain any and all information that is displayed on the devices in the dealership. In one embodiment, the email may include a link for the customer to post the vehicle purchasing event on his or her social networks. In another embodiment, when a customer schedules a service appointment with the dealership, the dealership management system 130 can push a notification to the ABN 110 and trigger an alert to the employee and the manager. The alert can inform the employee and the manager of the date that the customer will come to the dealership to have his or her car serviced and indicate what the service appointment is for. In one embodiment, an additional alert may be sent to the employee and the manager on the day that the customer is supposed to have his or her car serviced at the dealership. Any and all data traversing the system 100 may be stored in the database 150 for reporting, retrieval, and archiving.

In one embodiment, the system 100 may be utilized to convey various other types of messages at retail or non-retail venues. For example, the system 100 may cause devices to announce an employee of the month, events, various goodwill messages, acceptance of an award, sale promotions, and seasonal or holiday messages. In another embodiment, the manager may also utilize the system 100 to trigger a previously run event to run a second time. In yet another embodiment, the system 100 may trigger videos or other media content retrieved from a list of preapproved videos in the ABN network library to be displayed at the dealership to generate a lively event at a company's place of business.

In various embodiments, the generated content may comprise management content. Management content is typically content comprising or derived from customer data, employee data, business data, or combinations thereof. Notably, management content may, in some embodiments, be viewed by employees or customers via devices running the application. However, in some embodiments, management content may be restricted to groups of system client devices, which may be pre-defined, e.g., users running management applications. The management content may include content of interest to management, such as employee sales or location, and may be presented in a quickly ascertainable form, such as via graphs, tables, or charts. In various embodiments, the system comprises a management portal. For example, management content may be available through the management portal provided via the system application running on client devices, such as networked computers, mobile devices, or electronic devices. The management portal may provide restricted access to users via user privileges attached to login or access codes, device location, or the like. The management portal may allow a user to define the type of data, parameters, identity, or timeframe, for example, of the data depicted in the management content. Thus, in some embodiments, a user may customize the management content or submit queries for to the system 100 to generate defined management content. According to certain embodiments, the management content may be presented by the system as a display on a display device, an audio message, or a printout for example.

Figure 5:
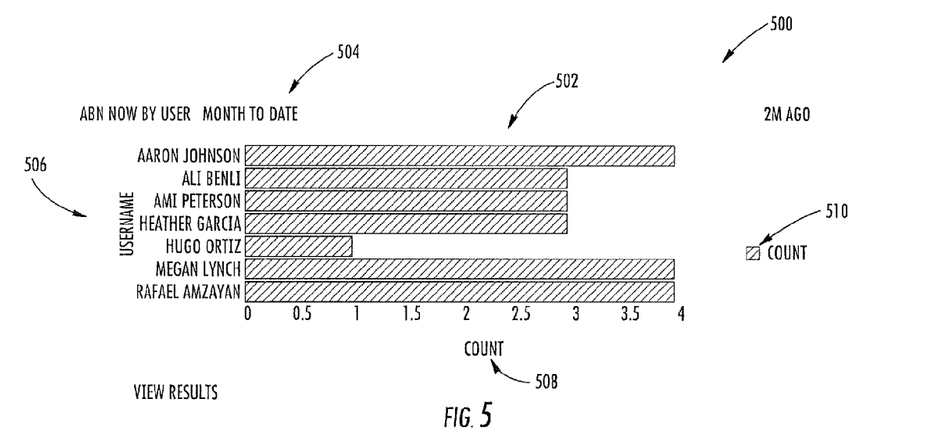
FIG. 5 illustrates a screen shot of generated management content according to various embodiments of the present disclosure.

FIG. 5 illustrates one embodiment of management content 500 comprising a graph depicting user utilization data 502, which may include employee, business, or customer data. The content 500 may be provided in a printout or device display. The content 500 encompasses utilization data 502 within a defined period of time, which has been defined as month to date 504 in this embodiment. Specifically, a list of system 100 users are provided along the y-axis by username 506. The x-axis provides a quantitative visualization of utilization 508 of the system 100 by counts 510.

Figure 6:
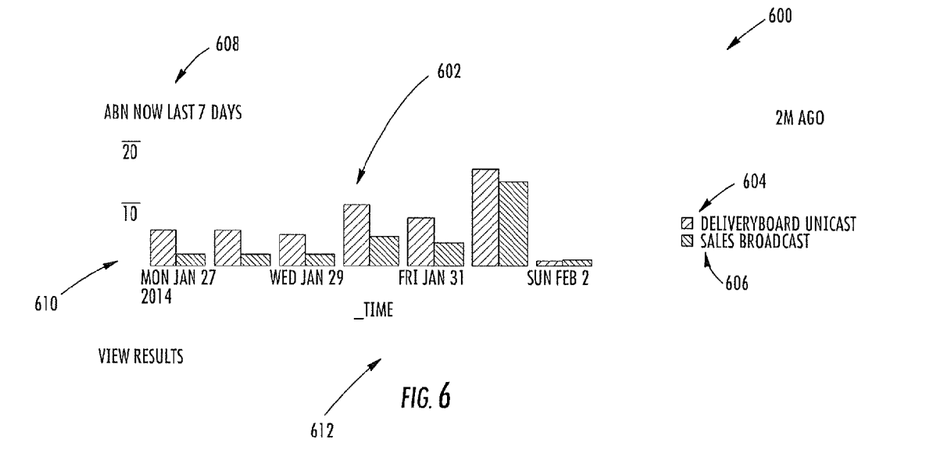
FIG. 6 illustrates a screen shot of generated management content according to various embodiments of the present disclosure.

FIG. 6 illustrates another embodiment of management content 600 comprising a graph depicting user utilization data 602 associated with a group of users. For example, the management content user may query the system 100 or request generation of management content 600 with respect to a group of users, e.g., a group of users associated with a dealership location or sales group. In this embodiment, the management content 600 depicts utilization data 602 comprising delivery board unicasts 604 and sales broadcasts 606 over a time period defined between the previous seven days 608. The y-axis provides defines the quantitative representation 610 and the x-axis defines the time 612, e.g., the date, associated with the data.

Figure 7:
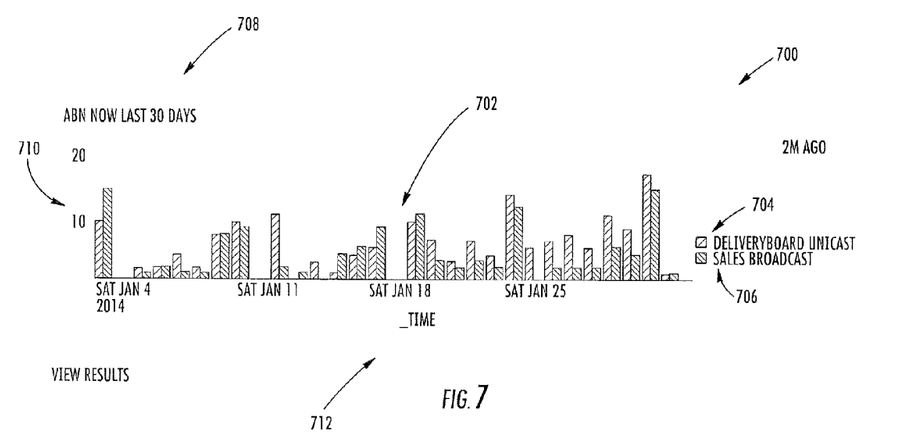
FIG. 7 illustrates a screen shot of generated management content according to various embodiments of the present disclosure.

FIG. 7 illustrates another embodiment of management content 700 a graph depicting user utilization data 702 of the group of users in the management content 600 of FIG. 6 over a longer time period, e.g., the last thirty days 708. The data 702 comprises delivery board unicasts 704 and sales broadcasts 706. The y-axis provides defines the quantitative representation 710 and the x-axis defines the time, e.g., the dates, 712 the data is associated with. Thus, the management content user may be provided with various tools via a management portal, for example, from which management content may be defined to form a query of system 100 utilization.

Figure 3:
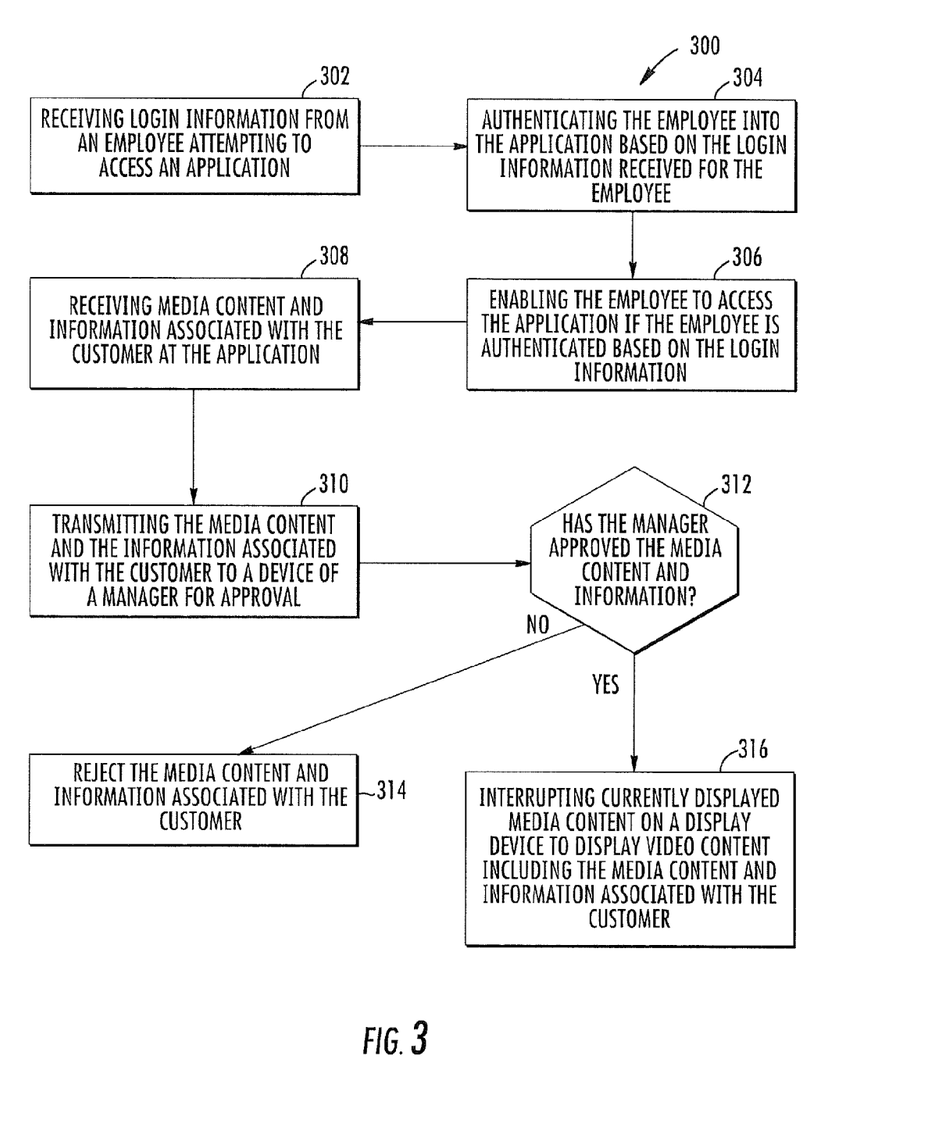
FIG. 3 is a flow diagram illustrating a sample method for real time distribution of data media according to an embodiment of the present disclosure.

As shown in FIG. 3, an exemplary method 300 for the real time distribution of media and data is schematically illustrated. The method 300 may include, at step 302, receiving login information from an employee attempting to access an application, such as a mobile application for an automotive dealership. In one embodiment, the login information may be received with the assistance of the server 112, mobile device 105, any combination thereof, or any other appropriate device. At step 304, the method 300 may include authenticating the employee into the application based on the login information received for the employee. In one embodiment, the login information may be authenticated by server 112 or any other appropriate device. At step 306, the method 300 may include enabling the employee to access the application if the employee is authenticated based on the login information. At step 308, the method 300 may include receiving media content and information associated with the customer at the application.

The method 300 may include, at step 310, transmitting the media content and the information associated with the customer to a device of a manager for approval. At step 312, the method 300 may include determining if the manager has approved the media content and information associated with the customer. If the manager has not approved the media content and information associated with the customer, the method 300 may include, at step 314, rejecting the media content and information associated with the user. However, if the manager has approved the media content and information associated with the user, the method 300 may include interrupting currently displayed media content on a display device to display video content or other media content that includes the media content and information associated with the customer. In one embodiment, the system 100 and methods described herein may further include utilizing any of the various components described in the system 100 to perform any of the operative functions disclosed herein.

It is important to note that the methods described above may incorporate any of the functionality, devices, and/or features of the system 100 and subsystems described above, or otherwise, and are not intended to be limited to the description or examples provided herein.

Figure 4:
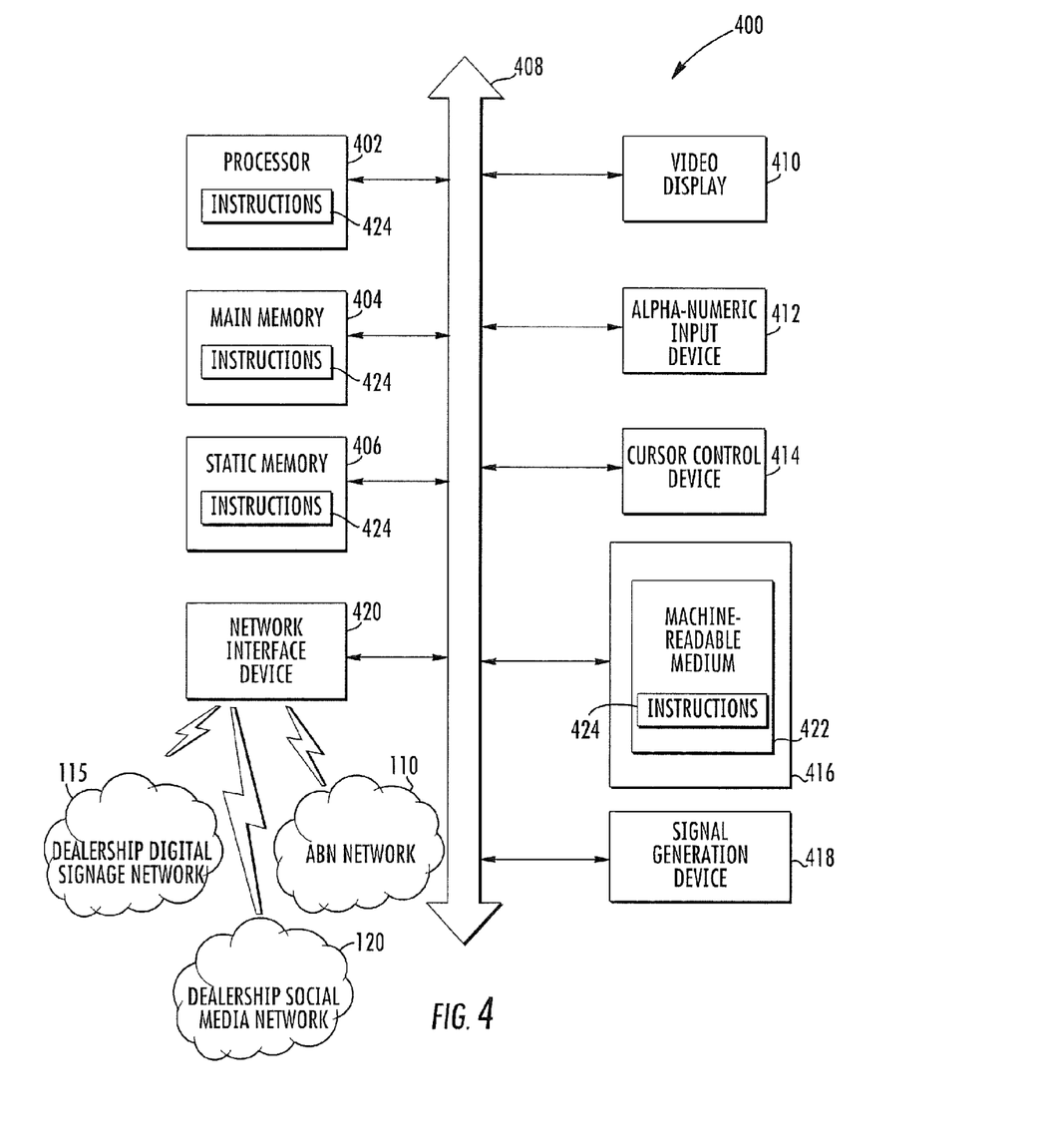
FIG. 4 is a schematic diagram of a machine in the form of a computer system within which a set of instructions, when executed, may cause the machine to perform any one or more of the methodologies of the system for real time distribution of data and media.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine operates as a standalone device. In some embodiments, the machine may be connected (e.g., using a ABN 110, dealership digital signage network 115, dealership social media network 120, and the dealership management system 130) to and assist with operations performed by other machines, such as, but not limited to, the server 112, the customer email servers 125, database 150, other device, or any combination thereof. The machine may be connected with any component in the system 100. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium or device 422 on which is stored one or more sets of instructions 424 (e.g., software) embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium or device 422 containing instructions 424 so that a device connected to the ABN 110, or any other desired network, can send or receive voice, video or data, and to communicate over the ABN 110 using the instructions. The instructions 424 may further be transmitted or received over the ABN network 110, dealership digital signage network 115, dealership social media network 120, or any other desired network, via the network interface device 420.

While the machine-readable medium or device 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium or device that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system for real time distribution of data and media, comprising:
a memory that stores instructions;
a processor that executes the instructions to perform operations, the operations comprising:
authenticating an employee into an application based on login information received for the employee;
enabling the employee to access the application if the employee is authenticated based on the login information received for the employee;
receiving from the employee, via the application, media content and information associated with a customer;
transmitting the media content and the information associated with the customer to a device of a manager for approval;
receiving the approval of the media content and the information associated with the customer from the device of the manager; and
interrupting currently displayed media content on a display device to display video content including the media content and the information associated with the customer;
wherein the media content and the information associated with the customer comprise a digital photograph of the customer taken by the employee during a point of sale transaction with the customer, and further comprise an audio message recorded by the employee regarding the point of sale transaction with the customer; and
wherein the operations further comprise playing the audio message over one or more speakers during at least a portion of the display of the video content including the media content and the information associated with the customer.

2. The system of claim 1, wherein the operations further comprise transmitting the media content and the information associated with the customer to a communications network, a digital signage network, a social network, a dealership management system, and email servers when the approval is made.

3. The system of claim 1, wherein the operations further comprise displaying the media content and the information associated with the customer on a social media webpage of a dealership associated with the employee.

4. The system of claim 1, wherein the operations further comprise comparing the media content and the information associated with the customer with previously stored information associated with the customer.

5. The system of claim 4, wherein the operations further comprise replacing the previously stored information with the media content and the information associated with the customer if the comparing of the media content and the information associated with the customer indicates that the previously stored information does not equal the media content and the information associated with the customer.

6. The system of claim 1, wherein the operations further comprise transmitting an electronic mail message to the customer that includes the media content and the information associated with the customer, wherein the electronic mail message includes a link to enable the customer to post the media content and the information associated with the customer on a social media webpage associated with the customer.

7. The system of claim 1, wherein the operations further comprise transmitting an initial alert to notify the employee of a customer arrival date and customer appointment information when the customer sets an appointment.

8. The system of claim 7, wherein the operations further comprise transmitting an additional alert to the employee on a date of the appointment.

9. The system of claim 1, wherein the media content and the information associated with the customer further comprise one or more of a digital photograph of a product associated with the customer, a customer name, a customer electronic mail address, and information associated with the product.

10. A method for real time distribution of media and data, comprising:
authenticating an employee into an application based on login information received for the employee;
enabling the employee to access the application if the employee is authenticated based on the login information received for the employee;
receiving from the employee, via the application, media content and information associated with a customer;
transmitting the media content and the information associated with the customer to a device of a manager for approval;
receiving the approval of the media content and the information associated with the customer from the device of the manager; and
interrupting, by utilizing instructions from memory and executed by a processor, currently displayed media content on a display device to display video content including the media content and the information associated with the customer;
wherein the media content and the information associated with the customer comprise a digital photograph of the customer taken by the employee during a point of sale transaction with the customer, and further comprise an audio message recorded by the employee regarding the point of sale transaction with the customer; and
wherein the method further comprises playing the audio message over one or more speakers during at least a portion of the display of the video content including the media content and the information associated with the customer.

11. The method of claim 10, further comprising displaying the media content and the information associated with the customer on a social media webpage of a dealership associated with the employee.

12. The method of claim 10, further comprising comparing the media content and the information associated with the customer with previously stored information associated with the customer.

13. The method of claim 12, further comprising replacing the previously stored information with the media content and the information associated with the customer if the comparing of the media content and the information associated with the customer indicates that the previously stored information does not equal the media content and the information associated with the customer.

14. The method of claim 10, further comprising transmitting an initial alert to notify the employee of a customer arrival date and customer appointment information when the customer sets an appointment.

15. The method of claim 10, further comprising transmitting an electronic mail message to the customer that includes the media content and the information associated with the customer, wherein the electronic mail message includes a link to enable the customer to post the media content and the information associated with the customer on a social media webpage associated with the customer.

16. The method of claim 10, further comprising triggering previously displayed content to be played again on the display device.

17. A computer-readable device comprising instructions, which when executed by a processor, cause the processor to perform operations comprising:
   authenticating an employee into an application based on login information received for the employee;
   enabling the employee to access the application if the employee is authenticated based on the login information received for the employee;
   receiving from the employee, via the application, media content and information associated with a customer;
   transmitting the media content and the information associated with the customer to a device of a manager for approval;
   receiving the approval of the media content and the information associated with the customer from the device of the manager; and
   interrupting currently displayed media content on a display device to display video content including the media content and the information associated with the customer;
   wherein the media content and the information associated with the customer comprise a digital photograph of the customer taken by the employee during a point of sale transaction with the customer, and further comprise an audio message recorded by the employee regarding the point of sale transaction with the customer; and
   wherein the instructions further cause the processor to perform operations comprising playing the audio message over one or more speakers during at least a portion of the display of the video content including the media content and the information associated with the customer.

18. The computer-readable device of claim 17, wherein the media content and the information associated with the customer further comprise one or more of a digital photograph of a product associated with the customer, a customer name, a customer electronic mail address, and information associated with the product.

19. A system for real time distribution of data and media, comprising:
   a memory that stores instructions;
   a processor that executes the instructions to perform operations, the operations comprising:
      authenticating an employee into an application based on login information received for the employee;
      enabling the employee to access the application if the employee is authenticated based on the login information received for the employee;
      receiving from the employee, via the application, media content and information associated with a customer;
      transmitting the media content and the information associated with the customer to a device of a manager for approval;
      receiving the approval of the media content and the information associated with the customer from the device of the manager; and
      interrupting currently displayed media content on a display device to display video content including the media content and the information associated with the customer;
      receiving an indication that a second customer has arrived at a dealership associated with the employee;
      determining, based on information associated with the second customer, that the second customer has a family member with an upcoming special occasion;
      requesting from the employee an indication regarding whether the family member is also at the dealership;
      in response to the indication that the family member is also at the dealership, prompting the employee to provide, via the application, a digital photograph of the family member and a message regarding the upcoming special occasion;
      receiving, via the application, the digital photograph of the family member and the message regarding the upcoming special occasion;
      transmitting the digital photograph of the family member and the message regarding the upcoming special occasion to the device of the manager for approval;
      receiving the approval of the digital photograph of the family member and the message regarding the upcoming special occasion from the device of the manager; and
      interrupting currently displayed media content on the display device to display the digital photograph of the family member and the message regarding the upcoming special occasion.

* * * * *